(12) United States Patent
Lesesky et al.

(10) Patent No.: US 11,536,629 B2
(45) Date of Patent: *Dec. 27, 2022

(54) HANDHELD MECHANICAL GAUGE, AND METHOD FOR MEASURING TREAD DEPTH OF A VEHICLE TIRE

(71) Applicant: ITIRE, LLC, Rock Hill, SC (US)

(72) Inventors: Alan C. Lesesky, Charlotte, NC (US); Samuel Duke Drinkard, Gaston, SC (US); Ryan D. Parks, Rock Hill, SC (US); Roy Stephens Osborne, Jr., Lancaster, SC (US); Steven A. Osborne, Lancaster, OH (US)

(73) Assignee: ITIRE, LLC, Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,305

(22) Filed: Feb. 22, 2022

(65) Prior Publication Data

US 2022/0170822 A1 Jun. 2, 2022

Related U.S. Application Data

(63) Continuation of application No. 16/654,485, filed on Oct. 16, 2019, now Pat. No. 11,255,753.

(51) Int. Cl.
*G01M 17/02* (2006.01)
*G01B 5/18* (2006.01)

(52) U.S. Cl.
CPC ............ *G01M 17/02* (2013.01); *G01B 5/18* (2013.01)

(58) Field of Classification Search
None
See application file for complete search history.

(56) References Cited

U.S. PATENT DOCUMENTS

| | | | |
|---|---|---|---|
| 3,170,243 A | 2/1965 | Williams | |
| 3,269,019 A | 8/1966 | Krohn | |
| 4,195,413 A * | 4/1980 | Haraguchi | G01B 7/26 702/166 |
| 4,257,107 A | 3/1981 | Heymsfield | |
| 4,526,030 A | 7/1985 | Vecera | |
| 6,662,456 B1 | 12/2003 | Triplett | |
| 6,789,416 B1 | 9/2004 | Tracy | |
| 7,497,113 B1 | 3/2009 | Patel | |
| 8,573,046 B1 | 11/2013 | Ohm | |
| 8,915,129 B2 | 12/2014 | Chebli | |

(Continued)

FOREIGN PATENT DOCUMENTS

GB 2543814 A * 5/2017 .......... B60C 25/007

*Primary Examiner* — Peter J Macchiarolo
*Assistant Examiner* — Jermaine L Jenkins
(74) *Attorney, Agent, or Firm* — Schwartz Law Firm, P.C.

(57) ABSTRACT

A mechanical gauge includes a stock panel with a first measurement scale, and a slide movably arranged relative to the stock panel. The first measurement scale has a series of marks spaced apart at regular intervals within a region of interest. The slide includes a second measurement scale adapted to selectively overlie the first measurement scale within the region of interest. The second measurement scale has a second series of marks spaced apart at regular intervals corresponding to the first series of marks of the first measurement scale. An elongated measurement probe is affixed to the slide and adapted for selectively extending into a groove formed in the tread of the vehicle tire.

20 Claims, 7 Drawing Sheets

(56) References Cited

U.S. PATENT DOCUMENTS

| | | | |
|---|---|---|---|
| 9,541,368 B2* | 1/2017 | Chou | G01B 5/18 |
| 2009/0205405 A1* | 8/2009 | Bauchot | B60C 11/24 |
| | | | 73/8 |
| 2015/0290160 A1 | 10/2015 | Cheng et al. | |

* cited by examiner

HANDHELD MECHANICAL GAUGE, AND METHOD FOR MEASURING TREAD DEPTH OF A VEHICLE TIRE

TECHNICAL FIELD AND BACKGROUND OF THE DISCLOSURE

The present disclosure relates broadly and generally to a handheld mechanical gauge applicable for use in the automotive and heavy duty trucking industries. In one exemplary embodiment, the present handheld gauge is used in combination with a mobile device (e.g., smartphone) equipped with a digital camera to measure, record, and report tread depth of a vehicle tire.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a handheld mechanical gauge for measuring tread depth of a vehicle tire. The mechanical gauge comprises a housing defining a display window. A fixed stock panel is attached to the housing and comprises a first measurement scale located within the window. The first measurement scale includes a first series of marks spaced apart at regular intervals within a region of interest defined by the display window. The total number of marks in the first measurement scale comprises a calibration value. A slide panel is movably arranged relative to the stock panel, and comprises a second measurement scale adapted to selectively overlie the first measurement scale within the window of the housing. The second measurement scale includes a second series of marks spaced apart at regular intervals corresponding to the first series of marks of the first measurement scale. As used herein the term "corresponding" means formed in a substantially identical size, shape, spacing, and pattern. At any overlying position of the second measurement scale relative to the first measurement scale within the region of interest, the combined number of exposed marks displayed through the window equals the calibration value. In one exemplary embodiment, a mark is considered "exposed" if greater than 50% of the mark appears uncovered within the region of interest (as defined by the display window). The term "equals", as used herein, allows for a certain acceptable degree of variation based on an analysis of the exposed marks within the region of interest. For example, the present disclosure may allow a tolerance of 1 (+/−) such that 33 and 35 "measured" marks are both equal to a calibration value of 34. An elongated measurement probe is affixed to the slide, and adapted for selectively extending and retracting relative to the housing. Tread depth of the vehicle tire is measured by extending the probe into a groove formed in the tire tread and then recording a measurement value using data displayed through the window.

According to another exemplary embodiment, the first measurement scale comprises first and second adjacent columns of spaced marks.

According to another exemplary embodiment, in the first measurement scale, the marks in the second column are staggered relative to the marks of the first column. As used herein, the term "staggered" refers to a slight offset of the marks in the two longitudinal columns such that laterally adjacent marks are not entirely side-by-side.

According to another exemplary embodiment, the second measurement scale comprises first and second adjacent columns of spaced marks.

According to another exemplary embodiment, in the second measurement scale, the marks in the second column are staggered relative to the marks of the first column.

According to another exemplary embodiment, the first and second columns of marks in the first and second measurement scales are aligned in substantial registration. The term "aligned in substantial registration" means that the two columns of the first measurement scale would be substantially superimposed upon the two columns of the second measurement scale if one scale were laid upon the other.

According to another exemplary embodiment, a manual thumb slide is adapted for moving the slide panel to extend and retract said measurement probe.

According to another exemplary embodiment, the housing comprises cooperating front and back sections.

According to another exemplary embodiment, a magnet is located inside the housing for releasably mounting the handheld gauge to a metal surface.

According to another exemplary embodiment, one of the front and back sections of the housing comprises a machine-readable code (e.g., quick response code or "QR code"). The code may be used for storing URLs or other information for reading by the mobile computing device (e.g., smartphone) of the present disclosure.

According to another exemplary embodiment, one of the first and second housing sections further comprises a product serial number.

According to another exemplary embodiment, the front housing section comprises measurement indicia along at least one side of the display window outside of the region of interest.

According to another exemplary embodiment, measurement indicia is provided along both sides of the display window outside of the region of interest.

According to another exemplary embodiment, the measurement indicia is provided in standard units along one side of the display window and in corresponding metric units along the other side of the display window.

In another exemplary embodiment, the present disclosure comprises a handheld measurement device for measuring tread depth of a vehicle tire. The mechanical gauge comprises a stock panel with a first measurement scale. The first measurement scale includes a first series of marks spaced apart at regular intervals within a region of interest. The total number of marks within the region of interest comprises a calibration value. A slide is movably arranged relative to the stock panel, and comprises a second measurement scale adapted to selectively overlie the first measurement scale within the region of interest. The second measurement scale includes a second series of marks spaced apart at regular intervals corresponding to the first series of marks of the first measurement scale. At any overlying position of the second measurement scale relative to the first measurement scale within the region of interest, the combined number of exposed marks within the region of interest equals the calibration value. An elongated measurement probe is affixed to the slide and adapted for selectively extending into a groove formed in the tread of the vehicle tire. A measured value of tread depth is obtained using data displayed within the region of interest.

In yet another exemplary embodiment, the present disclosure comprises a method for measuring tread depth of a vehicle tire. The method includes locating a handheld mechanical gauge adjacent the tread of the vehicle tire. The mechanical gauge comprises a first measurement scale including a first series of marks spaced apart at regular intervals within a predetermined region of interest. A slidable second measurement scale is adapted to selectively overlie the first measurement scale within the region of interest. The second measurement scale comprises a second series of marks spaced apart at regular intervals corresponding to the first series of marks of the first measurement scale. An elongated measurement probe is movable in unison with the slidable second measurement scale. The method further includes determining a calibration value comprising a total number of exposed marks within the region of interest of the mechanical gauge. The elongated measurement probe of the mechanical gauge is inserted and extended into a groove formed in the tread of the vehicle tire. With the probe extended, the region of interest of the mechanical gauge is photographed using a digital camera of a mobile computing device. The number of exposed marks of the first measurement scale which are located within the region of interest is determined, and the number of exposed marks of the second measurement scale which are located within the region of interest is determined. The method confirms that the sum total of exposed marks of the first and second measurement scales equals the calibration value. The tread depth is then calculated using a ratio of exposed marks of the first and second measurement scales within the region of interest.

According to another exemplary embodiment, determining the calibration value comprises photographing the mechanical gauge at the region of interest using the digital camera of the mobile computing device, and then calculating the total number of marks appearing within the captured image.

According to another exemplary embodiment, the method comprises electronically reading a machine-readable code (e.g., QR code) applied to the mechanical gauge.

According to another exemplary embodiment, the method comprises activating an alert on the mobile computing device once a successfully captured image of the region of interest is obtained.

According to another exemplary embodiment, prior to photographing the mechanical gauge, the method comprises activating a flash function of the digital camera based on environmental lighting conditions.

Broadly, in exemplary embodiments described further herein, the present disclosure comprises an apparatus, system and method for measuring, recording, and reporting tread depth of a vehicle tire. The exemplary disclosure may be implemented via a computer program product (e.g., software application or "mobile app") comprising program instructions tangibly stored on a computer-readable medium, and operable to cause a computing device to perform one or more steps of a method for calculating, recording and reporting tread depth of a vehicle tire. The present disclosure further comprises a computer-readable storage medium storing computer-executable instructions, executable by processing logic of a computing device, including one or more instructions, that when executed by the processing logic, cause the processing logic to perform one or more steps of a method for calculating, recording and reporting tread depth of a vehicle tire. In yet another exemplary embodiment, the present disclosure comprises an article of manufacture including a computer-readable storage medium, and executable program instructions embodied in the storage medium that when executed by processing logic of a computing device causes the processing logic to perform one or more steps of a method for calculating, recording and reporting tread depth of a vehicle tire. The computing device may incorporate or comprise any general or specific purpose machine with processing logic capable of manipulating data according to a set of program instructions. Examples of computing devices include high-end mobile phones or "smartphones", tablet computers, laptops, personal computers, and others.

Exemplary Mobile Computing Device

In one exemplary embodiment, the present disclosure utilizes a handheld mobile computing device (referred to herein as "mobile device"). The exemplary mobile device may comprise a smartphone using an operating system such as Google's Android, Apple's iOS, Maemo, Bada, Symbian, Windows Phone, Palm, Blackberry, and others. The mobile device may include a high-resolution touchscreen display, a web browser, high-speed data access via Wi-Fi and mobile broadband, and advanced application programming interfaces (APIs) for running third-party applications. The mobile device may also be equipped with NFC, and paired with NFC tags or stickers which can be programmed by NFC apps and other mobile apps on the device. For example, BlackBerry devices support NFC using BlackBerry Tag on a number of devices running BlackBerry OS. Other handheld mobile devices without built-in NFC chips may utilize MicroSD and UICC SIM cards incorporating industry standard contactless smartcard chips with ISO14443 interface, with or without built-in antenna.

The exemplary mobile device may also include card slots for removable or non-removable flash and SIM cards, and may have greater than 32 GB of non-volatile internal memory. One or more of the flash and SIM cards and internal memory may comprise computer-readable storage media containing program instructions applicable for performing one or more steps of a method for calculating, recording and reporting tread depth of a vehicle tire.

The SIM card contains an integrated circuit that securely stores the service-subscriber key (IMSI) used to identify a subscriber on the mobile device. SIM hardware typically consists of a microprocessor, ROM, persistent (non-volatile) EEPROM or flash memory, volatile RAM, and a serial I/O interface. SIM software typically consists of an operating system, file system, and application programs. The SIM may incorporate the use of a SIM Toolkit (STK), which is an application programming interface (API) for securely loading applications (e.g., applets) or data to the SIM for storage in the SIM and execution by the mobile device. The STK allows a mobile operator (such as a wireless carrier) to create/provision services by loading them into the SIM without changing other elements of the mobile device. One convenient way for loading applications to the SIM is over-the-air (OTA) via the Short Message Service (SMS) protocol.

Additionally, to identify a user's mobile device, a unique serial number called International Mobile Equipment Identity, IMEI, may be assigned to the device. The IMEI number may be used by the network to identify valid mobile devices. IMEI identifies the device, not the user (the user is identified by an International Mobile Subscriber Identity, IMSI, by a 15-digit number and includes information about the source of the mobile device, the model, and serial number. Other features of the exemplary mobile device may include front-facing and rear-facing cameras, Dolby Digital 5.1 surround sound, video mirroring and video out support, built-in speaker and microphone, built-in rechargeable lithium-polymer battery, and sensors including three-axis gyro, accelerometer, and ambient light sensor. The exemplary mobile device may also combine aGPS and other location services including Wi-Fi Positioning System and cell-site triangulation, Mobile Phone Tracking, Mobile Positioning, GMS localization, or other hybrid positioning system.

Exemplary specifications for three commercially available mobile devices are provided in the table below.

| Pixel ® 2 XL | iPhone ® X | Galaxy ® 9+ |
|---|---|---|
| OS - Android 8.0 | OS - iOS 11 | OS - Android 8.0 |
| Display - 6 inches (2880 × 1440 pixels) | Display - 5.8 inches (2436 × 1125 pixels) | Display - 6.2 inches (2960 × 1440 pixels) |
| Rear Camera - 12 MP (f/1.8) | Rear Camera - Dual 12-MP (wide-angle: f/1.8, telephoto: f/2.4) | Rear Camera - 12-MP Super Speed Dual Pixel (f/1.5 - f/2.4), 12-MP telephoto with 2x zoom (f/2.4) |
| Front Camera - 8 MP (f/2.4) | Front Camera - 7 MP (f/2.2) | Front Camera - 8-MP (f/1.7) |
| CPU - Snapdragon 835 | CPU - A11 Bionic | CPU - Snapdragon 845 |
| RAM - 4 GB | RAM - 4 GB | RAM - 6 GB |
| Storage - 64 GB, 128 GB | Storage - 64 GB, 256 GB | Storage - 64 GB |
| Size - 6.2 × 3 × 0.3 in | Size - 5.7 × 2.8 × 0.3 in | Size - 6.2 × 2.9 × 0.33 in |
| Weight - 6.2 ounces | Weight - 6.14 ounces | Weight - 6.7 ounces |

Exemplary Computing Environment

In an exemplary implementation discussed further below, the present system and method operates in an environment utilizing a client device, such as the mobile device described above, in communication with a host server (e.g., cloud server) over a computer network, such as the Internet. The host server may comprise a processor and a computer readable medium, such as random access memory (RAM). The processor is operable to execute certain programs used in the present system and method for calculating, recording and reporting tread depth of a vehicle tire, and other computer program instructions stored in memory. Such processor may comprise a microprocessor (or any other processor) and may also include, for example, a display device, internal and external data storage devices, cursor control devices, and/or any combination of these components, or any number of different components, peripherals, input and output devices, and other devices. Such processors may also communicate with other computer-readable media that store computer program instructions, such that when the stored instructions are executed by the processor, the processor performs the acts described further herein. Those skilled in the art will also recognize that the exemplary environments described herein are not intended to limit application of the present system and method, and that alternative environments may be used without departing from the scope of the invention.

Various problem-solving programs incorporated into the present system and method, and discussed further herein, may utilize as inputs, data from a data storage device or location. In one embodiment, the data storage device comprises an electronic database. In other embodiments, the data storage device may comprise an electronic file, disk, or other data storage medium. The data storage device may store features of the invention applicable for performing one or more steps of a method for calculating, recording and reporting tread depth of a vehicle tire. The data storage device may also include other items useful to carry out the functions of the present system and method. In one example, the present computer programs may further comprise algorithms designed and configured to perform one or more steps of a method for calculating, recording and reporting tread depth of a vehicle tire.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
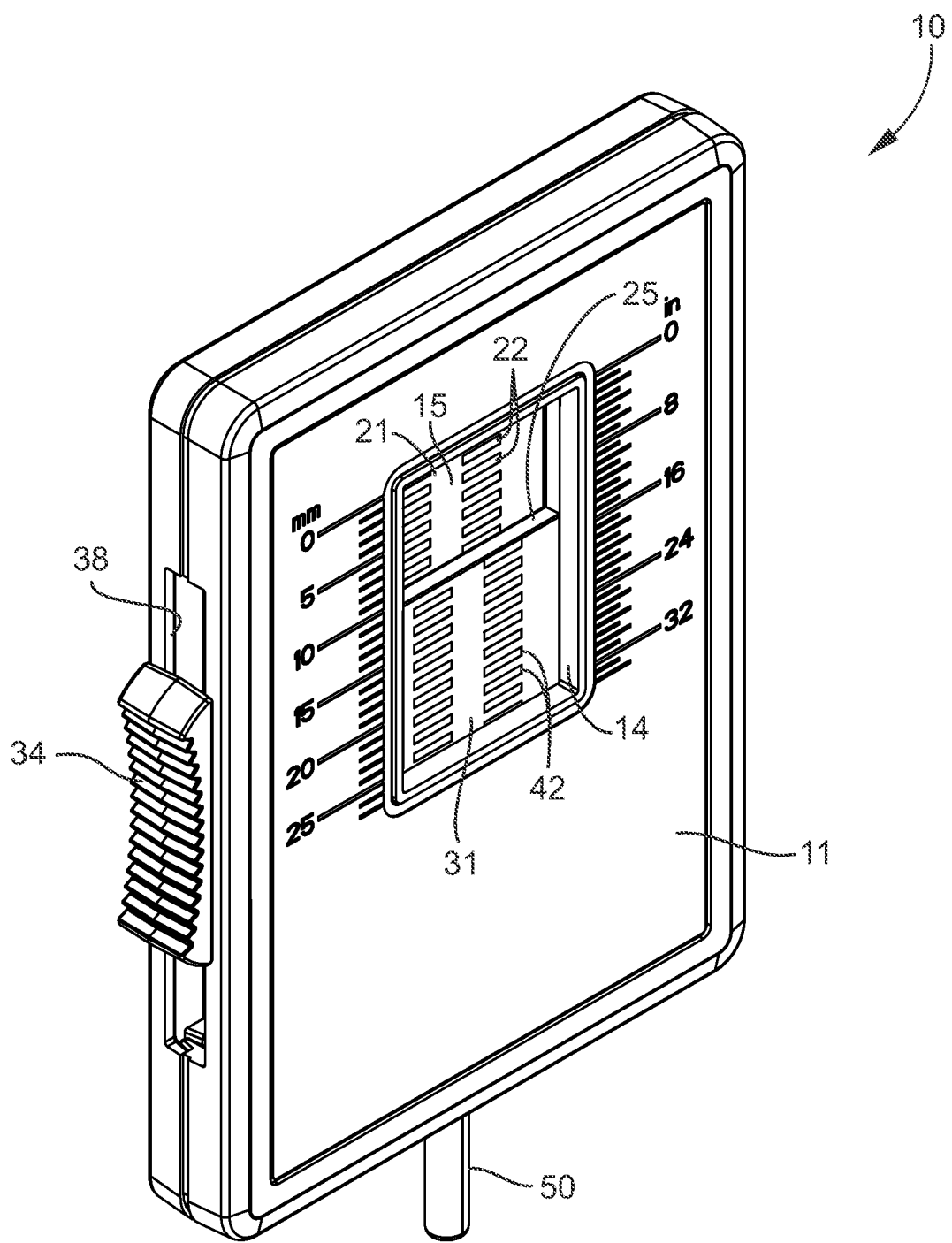
FIG. 1 is a perspective view of an exemplary handheld mechanical gauge applicable for use in the present system and method for measuring, recording and reporting tread depth of a vehicle tire.
Figure 2:
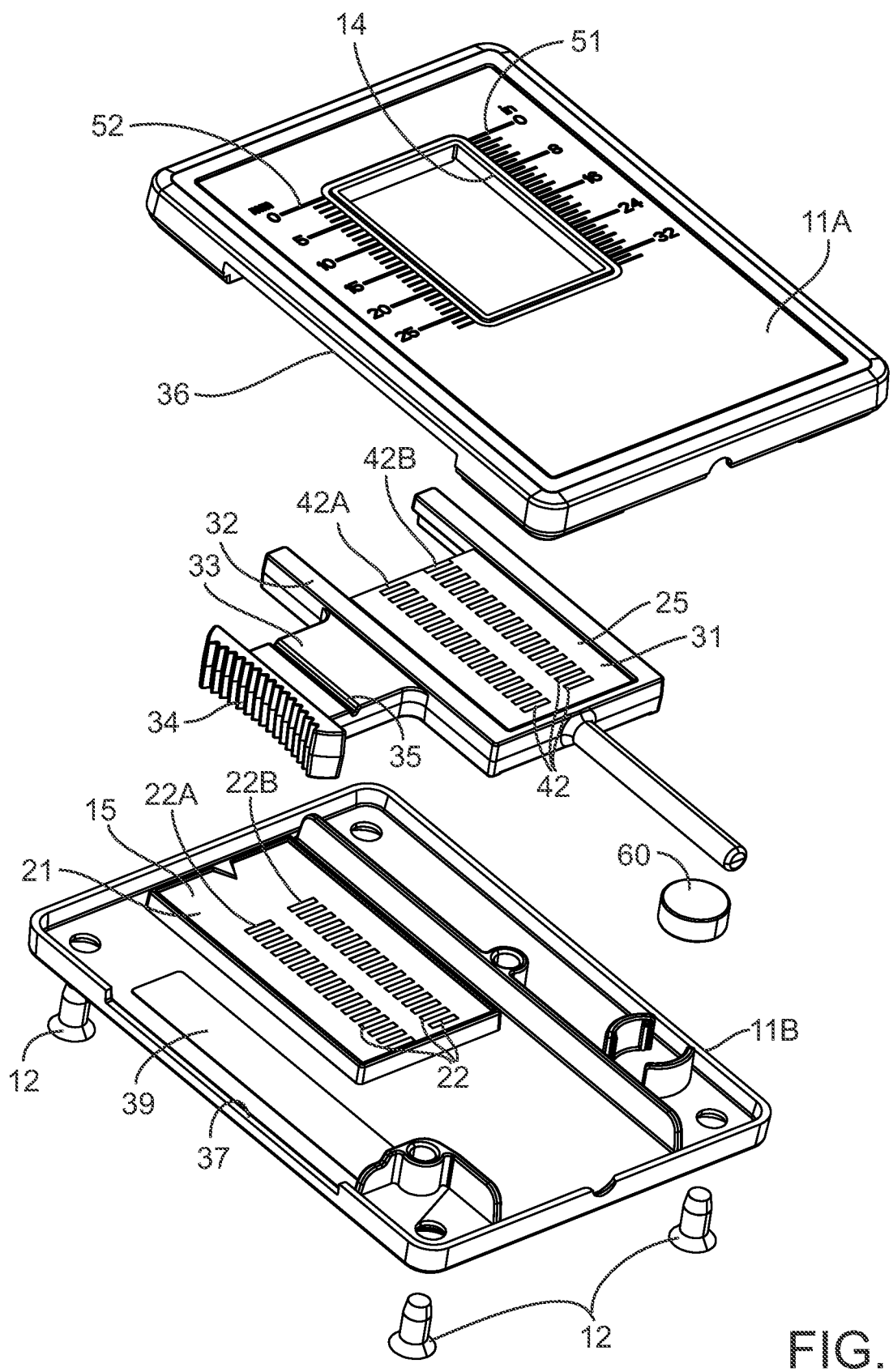
FIG. 2 is an exploded perspective view of the exemplary handheld gauge.

Referring now specifically to the drawings, a handheld mechanical gauge according to one exemplary embodiment of the present disclosure is illustrated in FIG. 1, and shown generally at broad reference numeral 10. In an exemplary implementation discussed further below, the present handheld gauge 10 is applicable for measuring depth of a vehicle tire tread "T"—See FIGS. 6-8. The gauge 10 cooperates with a mobile device "M" (e.g., smartphone) equipped with a high resolution digital camera "C"; both represented in FIG. 8 and discussed further below. The camera "C" is used by an operator to photograph an image of the gauge 10 at the time a tread measurement is taken. A software application operating on the mobile device analyzes the captured image, and using various algorithms and computing logic calculates the measured tread depth and records the value in standard/SAE or metric units, or both. The measured tread value may be stored in electronic (e.g., flash) memory of the mobile device, and/or transmitted wirelessly to any remote terminal such as a second mobile device, cloud server, vehicle electronic logging device (ELD), or other computing device. Using the mobile device, the measured tread value can also be associated with the exact vehicle tire by scanning a tire-identifying QR code, NFC tag, or other RFID tag applied to the tire. The measured tread value may also automatically insert into a corresponding field of an electronic vehicle inspection report.

The use of NFC tags to store vehicle and vehicle tire information is disclosed in Applicant's prior filed application, U.S. Publication No. US2017/0206446 filed on Jul. 20, 2017 and entitled "Smart Tag Assembly for Mounting on an Object to be Tracked". The complete disclosure of this prior publication is incorporated herein by reference. In one exemplary embodiment, the NFC tag may be applied to a sidewall of the vehicle tire using a rubber-to-rubber bonding interface with an identification label over-molded in rubber.

The use of a wireless inspection tool to collect tire pressure and temperature data is disclosed in Applicant's prior filed application, U.S. Publication No. US2013/035459 filed on Apr. 5, 2013 and entitled "Tire Data Collection and Communication Device, Multi-Purpose Handheld Data Collection and Communication Tool, and Method for Communicating Tire Data Between a Vehicle Tire and a Remote Computing Device". The complete disclosure of this prior publication is incorporated herein by reference. In one exemplary embodiment, the inspection tool gathers tire pressures and temperatures from a series of tires, associating this data with the appropriate vehicle and tire ID numbers. This data is then transferred to a remote computing device and then to cloud servers.

A self-contained dynamic vehicle wheel balancing system is disclosed in Applicant's prior filed application, U.S. Publication No. US20170259631 filed on Oct. 19, 2015 and entitled "Tire Sensor Mounting Assembly, Vehicle Wheel Balancer, Combination Tire Sensor Mounting Assembly and Wheel Balancer, Method for Mounting a Tire Sensor to a Vehicle Part, and Method for Balancing a Vehicle Wheel". The complete disclosure of this prior publication is incorporated herein by reference. In one exemplary embodiment, a hollow body is adhered to the tire's inner liner to form a circular path for the flow of balancing media during tire rotation, resulting in the accumulation of mass opposite of the heaviest region of the wheel assembly. In combination with the ability to track the history of tread depth, vehicle mileage, and fuel economy for an asset, evaluation of the efficacy of such dynamic wheel balancing is possible.

A system and method for wireless communication between a vehicle or vehicle component and a remote device is disclosed in Applicant's prior grant U.S. Pat. No. 6,064,299 filed on Aug. 8, 1997 and entitled "Apparatus and Method for Data Communication Between Heavy Duty Vehicle and Remote Data Communication Terminal". The complete disclosure of this prior publication is incorporated herein by reference. In one exemplary embodiment, the communication is carried out by a dongle device plugged into the vehicle diagnostic port and capable of the communication of vehicle information such as mileage, fuel economy, diagnostic codes, etc. with a mobile device such as a cellular phone.

Exemplary Handheld Gauge 10

Referring to FIGS. 1-4, the exemplary handheld gauge 10 comprises a housing 11 including separately molded front and back sections 11A, 11B joined together by screws 12. The front section 11A has an open square display window 14. A raised stock panel 15 is integrally formed with the back section 11B, and comprises a first measurement scale 21 located for viewing through the display window 14. The first measurement scale 21 includes a first series of rectangular marks 22 spaced apart at regular intervals within a region of interest "ROI" (FIG. 3) defined by the display window 14. The total number of marks 22 in the first measurement scale 21 establishes a calibration value. In one example, the first measurement scale 21 comprises thirty four (34) identical marks 22 arranged in two laterally adjacent columns 22A, 22B—17 marks per column. The marks 22 in the first column 22A are staggered relative to the marks 22 of the second column 22B such that laterally adjacent pairs of marks 22 are not entirely side-by-side.

A slide panel 25 is movably arranged relative to the fixed stock panel 15 inside the housing 11, and comprises a second measurement scale 31 adapted to selectively overlie the first measurement scale 21 within the display window 14. The slide panel 25 is formed within a generally U-shaped frame 32 constructed to reside closely adjacent the raised stock panel 15, and including a relatively thin integrally molded panel spacer 33 and textured thumb slide 34. The panel spacer 33 has a longitudinal groove 35 which mates with complementary internal rail (not shown) located on an inside of housing section 11A. With the housing sections 11A, 11B assembled, recessed edges 36, 37 cooperate to form a longitudinal slot 38 along which the slide panel 25 moves inside the housing 11. The textured thumb slide 34 is located outside of the housing 11, and is used by an operator to readily and conveniently move the slide panel 25 relative to the fixed stock panel 15. A contact surface of spacer 33 cooperates with textured strip 39 located on the inside of housing section 11B to form a friction interface sufficient to temporarily hold the selected location of the slide panel 25.

The second measurement scale 31 of slide panel 25 includes a series of marks 42 spaced apart at regular intervals corresponding to the first series of marks 22 of the fixed first measurement scale 21. The marks 42 of the second measurement scale 31 are identical in size, shape, spacing, and pattern to the marks 22 of the first measurement scale 21, but are printed in a contrasting color. For example, the individual marks 22 of the first measurement scale 21 may be solid yellow against an otherwise all black surface of the fixed stock panel 15, whereas the individual marks 42 of the second measurement scale 31 may be solid red against an otherwise all white surface of the slide panel 25. Like the first measurement scale 21, the marks 42 of the second measurement scale 31 are arranged in two laterally adjacent columns 42A, 42B—17 marks per column. The marks 42 in the first column 42A are staggered relative to the marks 42 of the second column 42B such that laterally adjacent pairs of marks 42 are not entirely side-by-side.

In the present example, the first and second columns of marks 22A, 22B & 42A, 42B in the first and second measurement scales 21 and 31 are aligned in substantial registration. In other words, as the slide panel 25 is moved up and down inside the housing 11 relative to the fixed stock panel 15, the respective pairs of mark columns 22A, 22B & 42A, 42B become selectively superimposed within the region of interest "ROI" defined by the display window 14. At any overlying position of the second measurement scale 31 relative to the first measurement scale 21, the combined number of exposed marks 22, 42 within the region of interest "ROI" equals the calibration value. As stated previously, a mark 22, 42 may be considered "exposed" if greater than 50% of the mark 22, 42 appears uncovered within the region of interest "ROI" (as defined by the display window 14).

Figure 3:
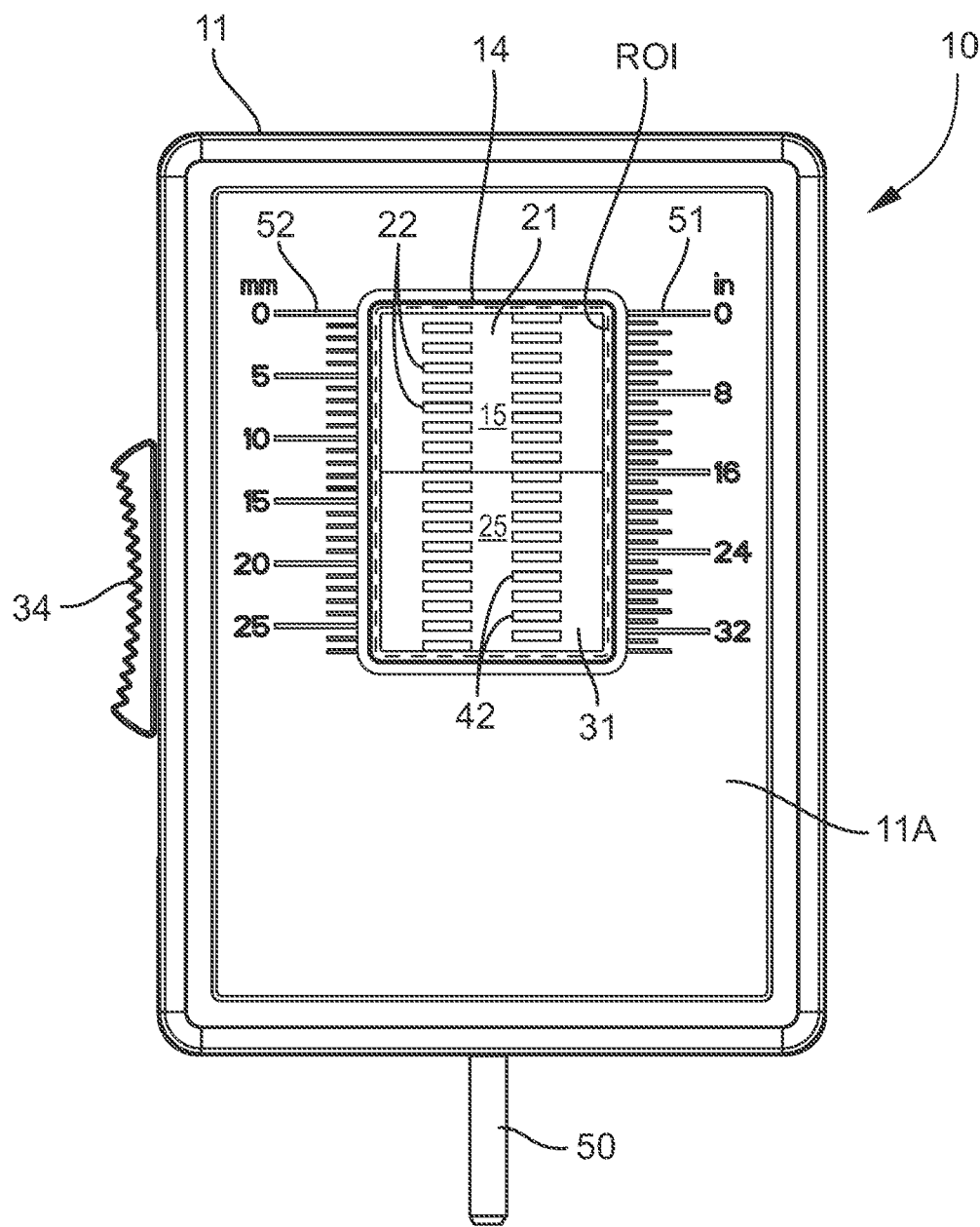
FIG. 3 is a front view of the exemplary handheld gauge.

An elongated measurement probe 50 is affixed to the slide panel 25, and is adapted for selectively extending and retracting relative to a bottom end of the housing 11. As discussed further below, tread depth of the vehicle tire is measured by extending the probe 50 into a groove "G" formed in the tire tread "T" (FIGS. 6-8) and then recording a measurement value using data displayed through the window 14. Measurement indicia 51, 52 may be provided adjacent both sides of the display window 14 outside of the region of interest "ROI", as best shown in FIG. 3. In one embodiment, the measurement indicia 51, 52 is provided in standard units along one side of the display window 14 and in corresponding metric units along the other side of the display window 14.

Figure 4:
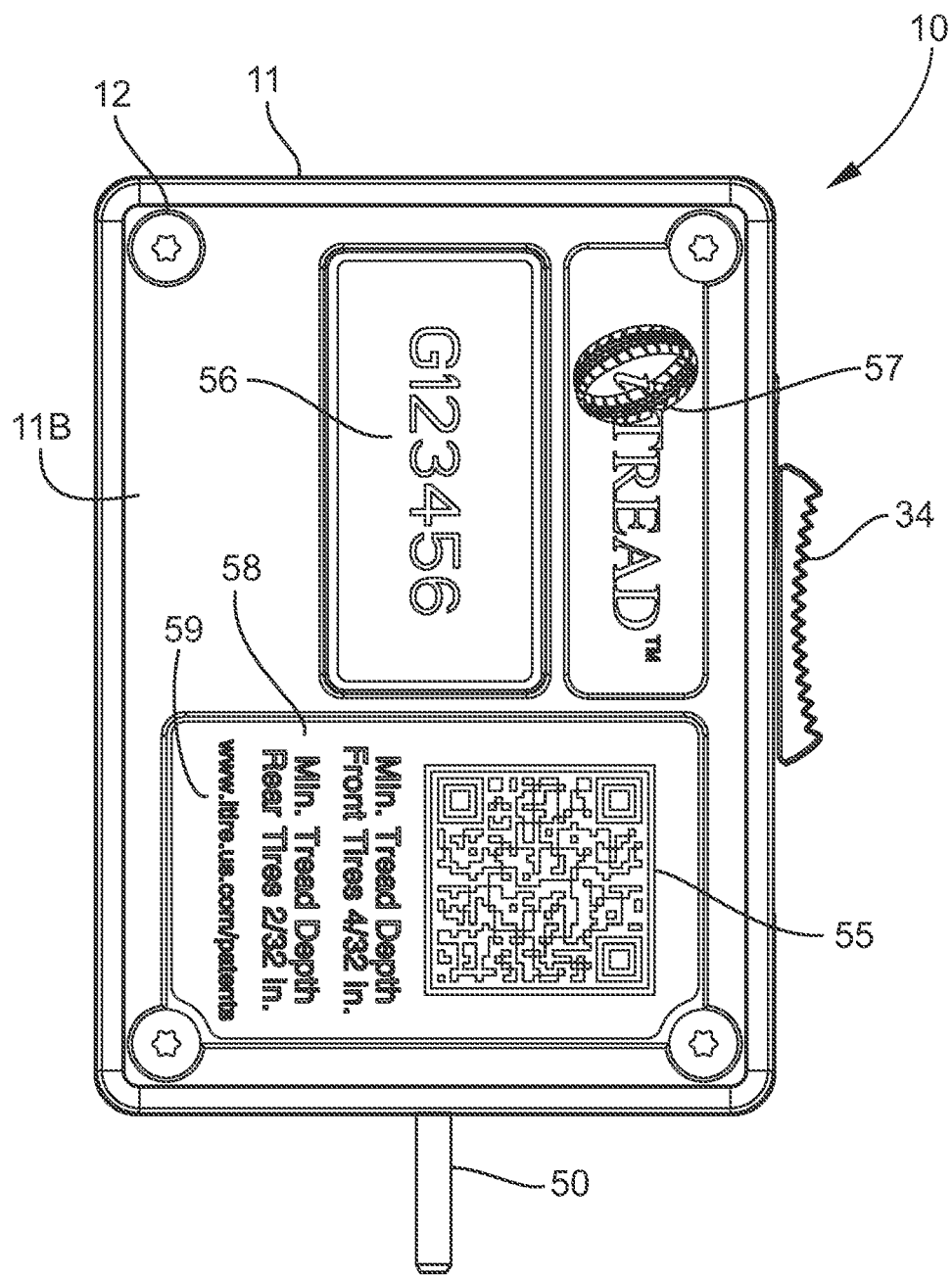
FIG. 4 is a rear view of the exemplary handheld gauge.

Referring to FIG. 4, one or more labels may be applied to the back section of the housing and may comprise machine-readable code, such as a high capacity colored 2-dimensional (HCC2D) QR code 55. The QR code 55 may be used for storing URLs or other information for reading by the mobile device (e.g., smartphone) of the present disclosure. This and other labels may comprise a product serial number 56, branding indicia 57, minimum tread depths 58, website addresses 59, and other useful information. Additionally, a magnet 60 may be located inside the housing 11 for releasably mounting the gauge 10 to a metal surface.

Exemplary System Software

The exemplary system software comprises a "mobile app" downloaded (e.g., via cloud server) to the operator's mobile device. The system software is used in combination with the exemplary handheld gauge 10 described above, wherein the individual marks 22 of the first measurement scale 21 of the fixed stock panel 15 are solid yellow against an otherwise all black background surface, and the individual marks 42 of the second measurement scale 31 of the slide panel 25 are solid red against an otherwise all white background surface.

Figure 5:
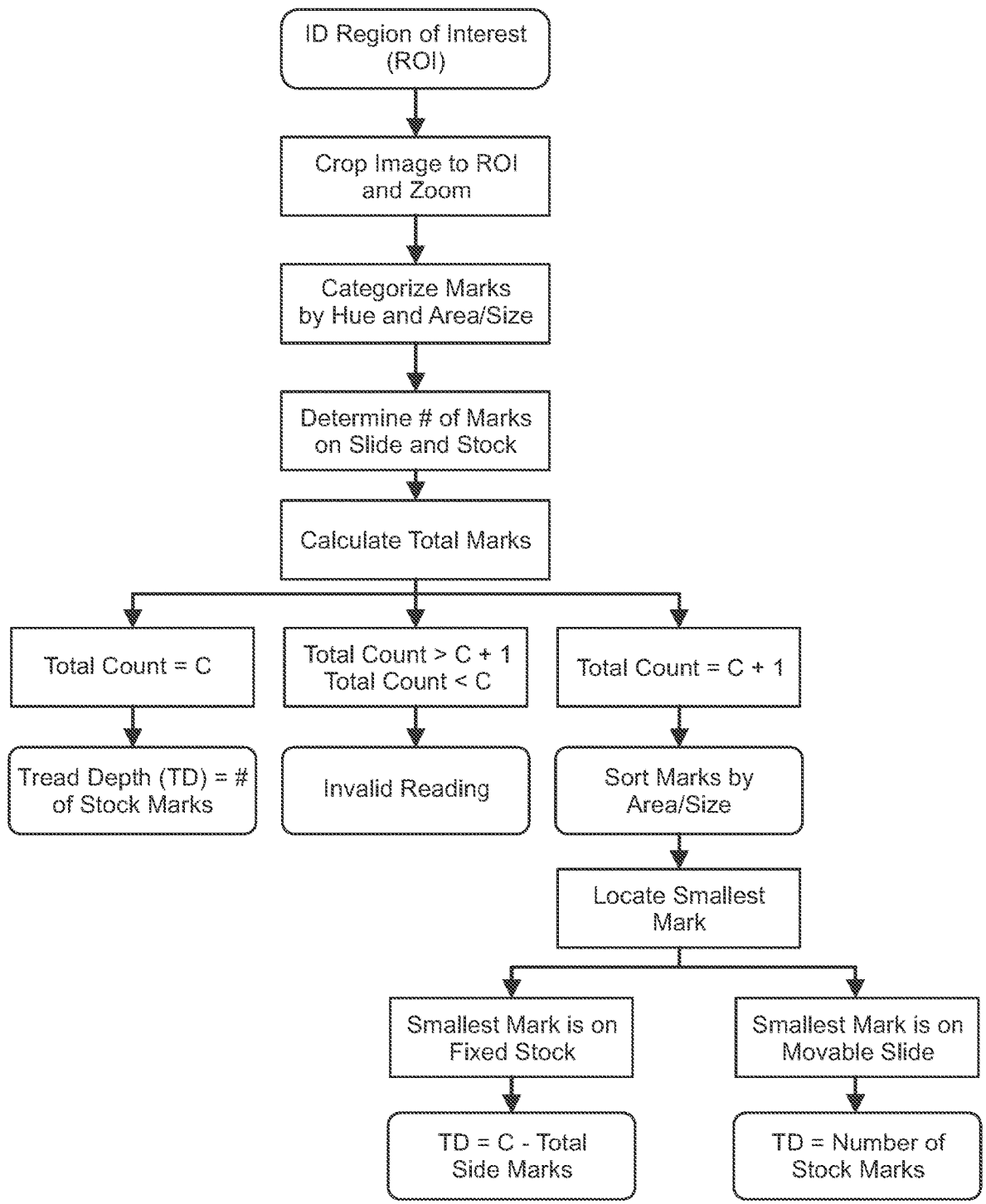
FIG. 5 is a flow diagram of software used in the exemplary system and method of the present disclosure.
Figure 8:
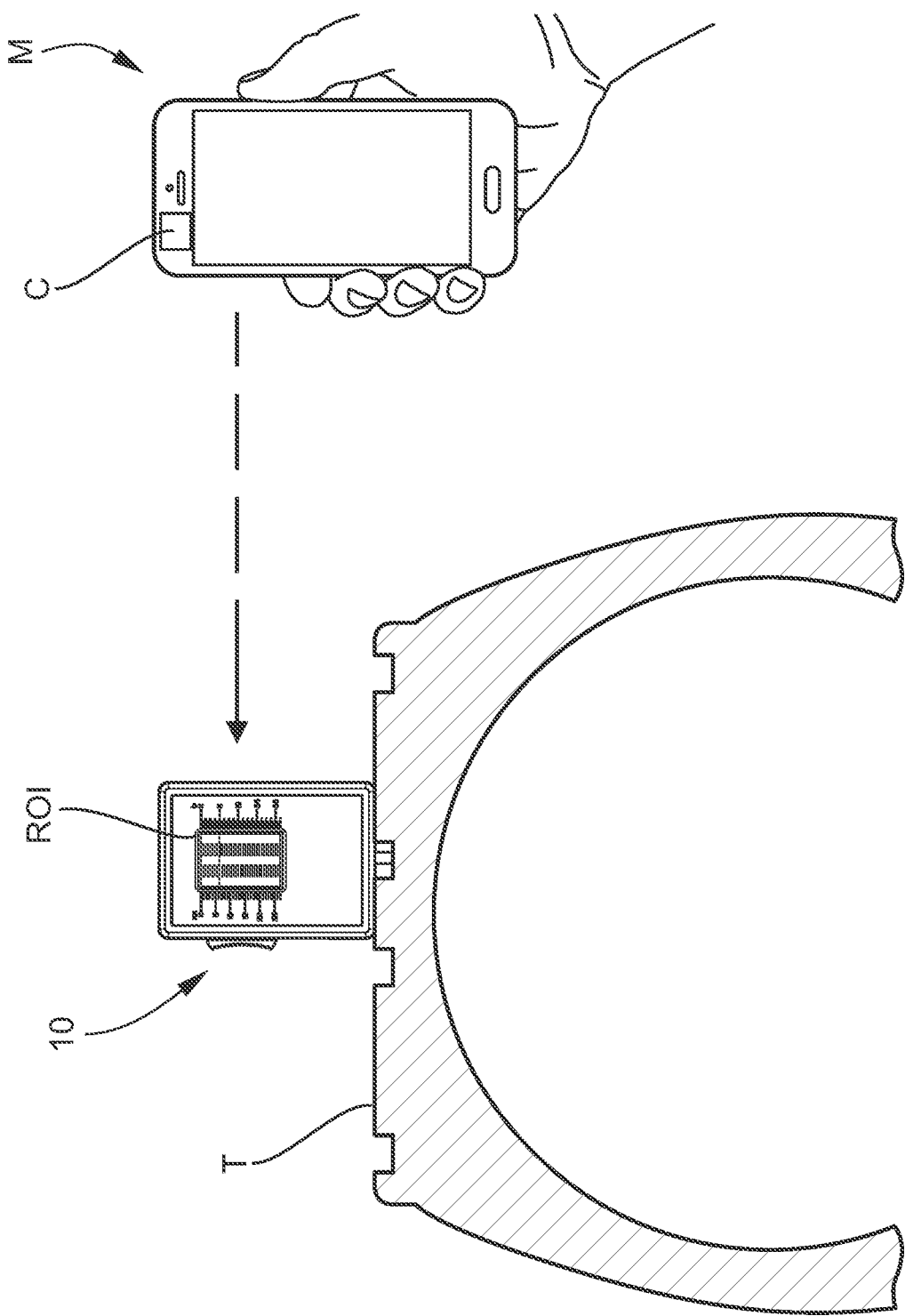

The exemplary software functions according to the flow diagram of FIG. 5. First, aiming the digital camera "C" of the mobile device "M" at the handheld gauge 10, as shown in FIG. 8, the software samples an ongoing stream of frames captured by the mobile device's image sensor. Ideally, the sample rate would match the capture rate of the image sensor, but satisfactory results can be achieved at a much lower sample rate frequency. Initial analysis by the software is seeking to identify the designated region of interest "ROI", described above and indicated in FIG. 3. The software does this by filtering for certain defining visual characteristics of marks 22, 42 detected within the ROI, such as hue, shape, size, and relative spacing. To increase the likelihood that the software accurately identifies the desired "ROI", the relative size of the "ROI" in relation to the frame size can be bound to a percentage range that will reduce the likelihood of false positives, but also allow the gauge 10 to be read at a reasonable distance from the imaging sensor.

Once the "ROI" of the gauge 10 has been located, it can be isolated from the rest of the captured image by cropping. The remaining image area is then enlarged to fit the device frame size through use of a "nearest neighbor" zoom algorithm. By using colored marks 22, 42 with well-defined rectangular borders, the zoom algorithm can more accurately enlarge the "ROI". This enlarged image can now be analyzed. Two filter passes are made in order to detect the two visually distinct marks 22, 42 located on the first and second measurement scales 21, 31 of the gauge 10. These marks 22, 42 are differentiated by at least one characteristic, in this case hue. Hue, as part of the HSV (Hue, Saturation, Value) color model designates the degree to which a stimulus can be described as similar to or different from stimuli that are described as red, green, blue, and yellow. This attribute is generally less reliant on lighting conditions. Pairs of contrasting hues (e.g., red and yellow) are established to ensure that the marks 22, 42 located on measurement scales 21, 31 of the fixed stock panel 15 and slide panel 25 can be reliably distinguished by computer vision analysis. The first pass detects the hue of exposed marks 42 located on the movable slide panel 25, and the second pass detects the hue of the exposed marks 22 located on the fixed stock panel 15. The combined total number of exposed marks 22, 42 detected in both of these groups is then calculated. This total is then compared to the calibration value (C) discussed above—or, 34 in the present example. If the total exposed marks 22, 42 detected equals C, then the tread depth reported to the operator is equal to the number of exposed marks 22 detected on the fixed stock panel 15. This number divided by 32 will indicate the measured tread depth in inches. The total number of exposed marks 22, 42 will equal C when the tread depth measured falls exactly on the aligned border between two marks.

If the total number of exposed marks 22, 42 detected is greater than C+1 or less than C, then the reading is determined to be invalid and no depth value is reported to the operator. The only case where this condition should occur is if the marks 22, 42 are obstructed from the image sensor of the mobile device "M", and an accurate reading cannot be given in this circumstance.

If the total number of exposed marks 22, 42 detected equals C+1, a determination must be made about the area/size of the two partially exposed marks. Each of the two partially exposed marks is necessarily smaller than the fully exposed marks. Therefore, the marks are sorted by size/area and the smallest mark is further analyzed. The determination of the smaller mark's category allows a rounding decision to be made. If the partially exposed mark is a stock panel mark, then the depth is rounded down by reporting to the operator a depth value of C minus the number of slide panel marks detected. This number is divided by 32 to indicate the measured tread depth in inches. If a slide panel mark 42 is determined to be the smallest, then the tread depth is rounded up by reporting to the operator a depth value equal to the number of stock panel marks 22 detected. This number is then divided by 32 to indicate the measured tread depth in inches.

There are several methods that could be employed to address the case where marks 22, 42 are only partially exposed. A mechanical solution would be to add gradient friction detents in the measurement probe 50 of the gauge 10, such that the probe 50 extends into the tread groove in a predetermined step-wise fashion corresponding to the unit scale defined by the spaced marks. Another exemplary solution may be to increase the "resolution" of the gauge 10 by increasing the calibration value from 34 to 68, using more closely spaced marks 22, 42 on the measurement scales 21, 31 of both the slide and stock panels 15, 25. Alternatively, the software could analyze the partially exposed mark within region of interest "ROI" and determine if the mark is greater than or less than 50% exposed. In calculating tread depth, marks which are greater than 50% exposed are counted while marks which are less than 50% exposed are not.

Tread Depth Inspection—Process

Figure 6:
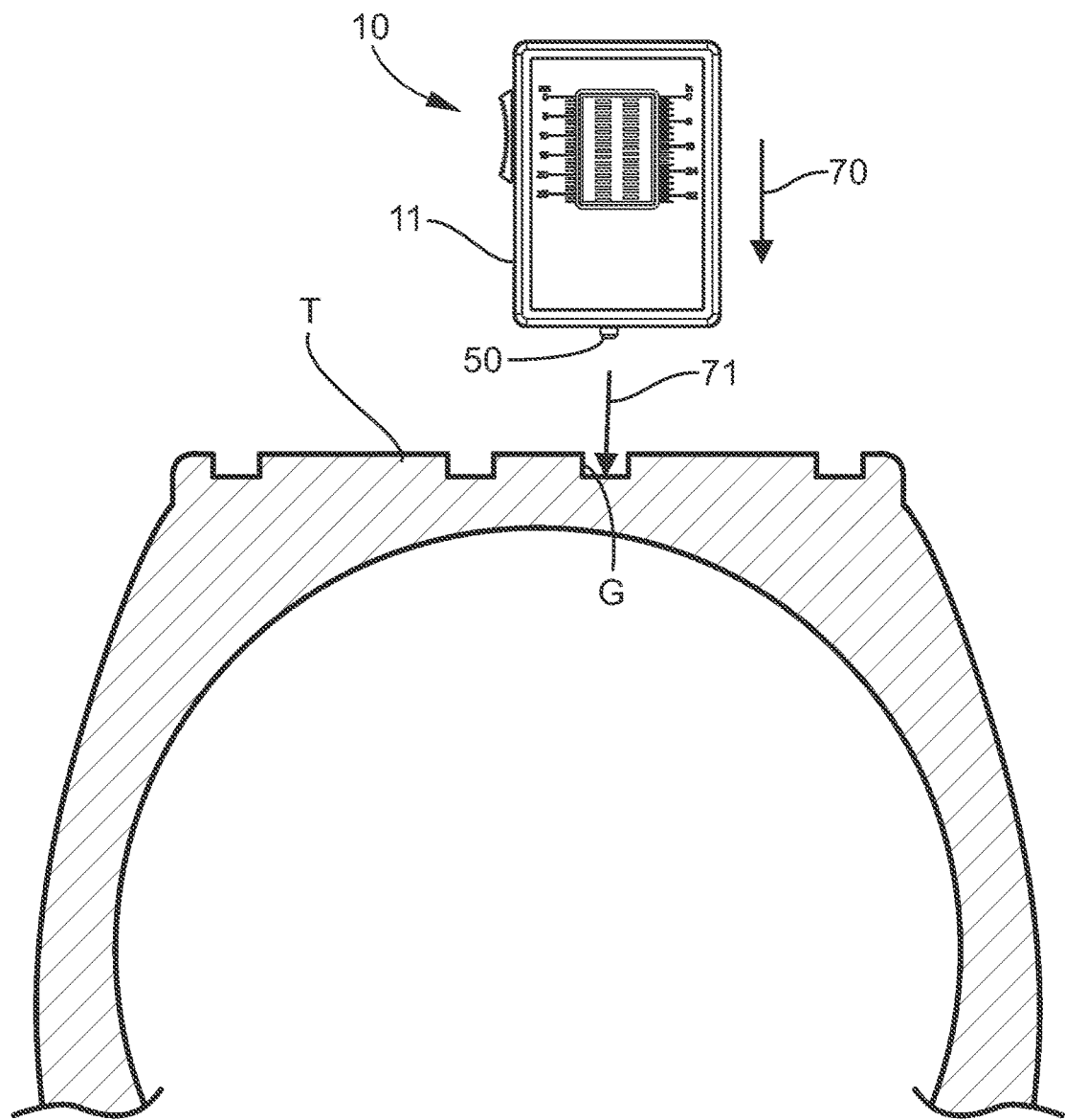
FIGS. 6, 7, and 8 demonstrate operation of the exemplary gauge in combination with a mobile device equipped with a digital camera.
Figure 7:
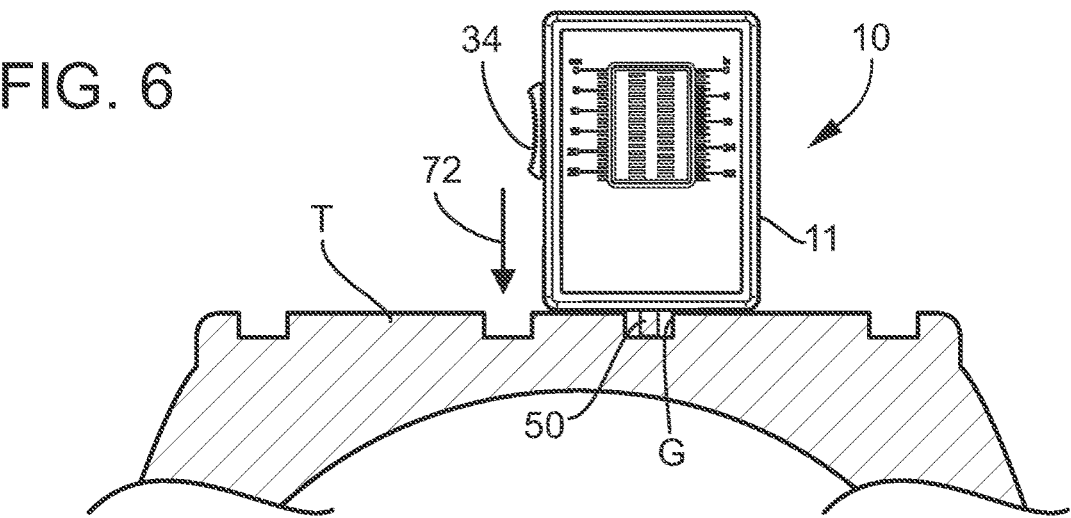

Referring to FIGS. 6-8, in one exemplary implementation a tread depth inspection may proceed as described below. An operator (or "inspector") outfitted with a mobile device "M" and the present handheld gauge 10 opens a software app on his mobile device to begin the inspection. Using the mobile device "M", the inspector first identifies himself by scanning a machine-readable code, such as QR code printed on an inspector identification badge, or by reading an NFC tag embedded in one of the vehicle tires. Alternatively, identity of the inspector could be entered and confirmed through a traditional login screen on the software app, or using the mobile device ID, or using data obtained by reading the QR code applied to the inspector's gauge 10. Next, the vehicle to be inspected may be identified by scanning a machine-readable ID label (e.g., QR code) affixed to the vehicle or vehicle tire, or by reading and receiving an ID code contained in the NFC tag embedded in one of the tires. Additionally, the vehicle ID label and/or NFC tag may store information about the configuration of the vehicle (e.g., number of axles, wheel positions, etc.) to dictate the format the inspection report. Alternatively, the vehicle ID could be manually entered into designated fields of the mobile app. Using appropriate communications hardware and software, the vehicle ID may be transmitted wirelessly (Bluetooth, WiFi, etc.) from the vehicle databus, electronic logging device (ELD), or other vehicle computer directly to the mobile device "M". Once the vehicle ID is input, the tire inspection has begun, and information such as inspection start time/date and GPS location can be captured from the mobile device "M" and stored with the report. The mileage from the vehicle odometer may be manually input, or using appropriate communications hardware and software, may be transmitted wirelessly (Bluetooth, WiFi, etc.) from the vehicle databus, electronic logging device (ELD), or other vehicle computer directly to the mobile device "M". There are several different mileage calculations that can be pulled from the vehicle databus, such as Engine Control Module (ECM) Distance, Engine Distance, and Cab Computer Distance; the appropriate metric is chosen and recorded. One such device that could carry out the data transfer connects to the vehicle diagnostic port and uses a Bluetooth transceiver to communicate wirelessly with a mobile device. Once this information is gathered, the software app will advance to tire inspection mode. A viewfinder overlaid on the device's camera feed will appear on touchscreen ready to collect tire ID and tread depth readings. Individual tire information can now be gathered.

Starting with the tires of the drive axle on the driver-side, the inspector scans the printed QR code or embedded NFC tag of the ID label on that tire. Next, three tread depth measurements are carried out on the tire tread "T" using the handheld gauge 10 and mobile device "M", as described above. The first measurement should be carried out on the outer edge of the tread pattern, the second measurement at the center of the tread pattern, and the third at the inner edge of the tread pattern.

As demonstrated in FIGS. 6, 7, and 8, a tread depth measurement is performed by placing the handheld gauge 10 down upon the peak of the tire tread, as indicated by arrow 70 in FIG. 6, with the measurement probe 50 in a fully retracted condition. The slight protrusion of the probe 50 from the bottom end of gauge housing 11 serves to properly locate the gauge 10, as indicated by arrow 71 of FIG. 6, relative to the groove "G" of the tread region being inspected. Once properly located, as shown in FIG. 7, the thumb slide 34 of the gauge 10 is manually shifted downward, as indicated by arrow 72, to extend the probe 50 into the tread groove "G". Holding the gauge 10 in an upright and squared position with one hand, the other hand is used to aim the camera "C" of the mobile device "M" at the gauge 10, as shown in FIG. 8, taking care not to obstruct the targeted region of interest "ROI." Alternatively, the handheld gauge 10 can be read when removed from the tire tread "T" by enabling a temporary locking mechanism (or a simple "friction lock") applicable for holding the extended probe 50 in position after inserting into the tire groove "G". The inspector can then properly orient the camera "C" of the mobile device "M" relative to the gauge 10 before taking the photograph and capturing the ROI.

Upon successfully capturing a reading from the gauge 10, the mobile device "M" may alert the inspector by providing haptic feedback through a vibration motor, visual feedback on the display, and/or audio feedback through the device speakers. This data is then stored in flash or other memory of the mobile device "M", and can be immediately displayed to the inspector on the device's touchscreen. This procedure is repeated until all tires of the vehicle have been inspected. An electronic inspection report is then automatically populated and wirelessly transmitted to a cloud server or other remote terminal, or sent via email, MMS, or other messaging service to devices of other individuals. The inspector's mobile device "M" may also wirelessly connect to the vehicle electronic logging device (ELD) and other sensors in and around the vehicle to automatically populate the tire inspection report with additional useful information, such as vehicle fault codes, tire pressure, mileage, vehicle weight, and vehicle driver information (such as that required by law to be maintained by the vehicle ELD). Tire pressure/temperature could be obtained from a wirelessly connected tire inspection tool. A record of a tire's pressure readings could be related to tread depth over time to perform maintenance analysis and determine the financial return for varying maintenance practices.

Camera and Lighting

Unlike conventional cameras, mobile device cameras "C" generally do not have a short minimum focal length, as they are made primarily for capturing photos some distance away from the camera. As such, in order for the handheld gauge 10 to be in focus, it should be between 7 to 9 inches from the camera "C". At this distance, the gauge 10 appears quite small to the inspector, and to a lesser degree, the computer vision analysis program. For this reason, an automatic zoom feature may be incorporated to digitally enlarge the gauge 10, thereby facilitating faster and more accurate readings of the ROI. During initial installation and setup process, the present software app may determine the make and model information of the particular mobile device 10. If the device type is recognized, application parameters can be adjusted to match the previously determined settings best for that device's camera "C". A query can also be sent to the device system in order to adjust sensor settings, such as shutter speed, aperture opening, and color correction to optimize for proper gauge readings.

Additionally, the present mobile device "M" may be equipped with one or more LEDs that provide a flash function for camera sensors. This same LED lighting can serve as a flashlight to clearly display the handheld gauge 10 when ambient lighting conditions are otherwise inadequate. Similarly, the exemplary mobile device "M" may incorporate photometers which detect ambient lighting conditions, and provide output used to initiate the camera flash when needed. The computer vision algorithms of the present software are tuned such that the filter parameters adapt to current lighting conditions and LED activity. Light level data from the device's photo sensors can also be used to determine the proper color filter parameters to use in identifying color of the scale marks.

Alternative Exemplary Embodiments

In alternative embodiments, the handheld gauge may be marked with a calibration pattern for comparison and with a measurement pattern that is variably exposed based upon tread depth. By measuring the number of pixels in the height of the calibration pattern (Pc) and comparing it to the known height of the calibration pattern (C), a relationship between pixels and height [the pixel height ratio (R)] can be established. The number of pixels composing the measurement pattern in the image varies based upon the camera's distance from the gauge.

$$R = \text{Callibration Pattern Height } (C) / \text{Total Vertical Callibration Pixels } (Pc)$$

Once (R) for the image is found, the number of vertical pixels in the measurement pattern (Pm) can be determined. This value can then be multiplied by R to find the tread depth.

$$\text{Tread Depth} = R \times \text{Vertical Measurement Pixels } (Pm)$$

In other exemplary embodiments, the tread depth may be determined using Optical Character Recognition (OCR) of a readable gauge display. The present disclosure may also employ color recognition/comparison to identify a region of exposed measurement pattern in a measurement probe, and how far the probe is extended into the tread. This same principal can be used to take measurements on many other elements of the vehicle, as well as for purposes beyond the automotive field. Utilizing concepts of the present disclosure, fluid levels in battery, coolant and other systems could be measured. The severity of damage such as dents, scratches, and cracked glass could be evaluated. Material thickness could be assessed across many different dimensioning use cases. Many other types of measurement equipment can also be incorporated into this data collection system by displaying weight, pressure, distance, and other measurements in a format to be read optically by the mobile device.

Additional applications for this technology include the reading of specially adapted instruments such as brake calipers, spark plug gap gauges, wheel alignment measurement devices, calipers for general measurement, slack adjuster/brake stroke measurement tools, and angular measurement devices. In further exemplary applications, the present technology can be used to read the tire tread depth measurements and store them when using depth micrometers, micrometers, and vernier calipers. The present technology can be utilized in small places, and is capable of measuring distances as small as 0.0001. The measurements can be stored quickly, and will not be subject to operator "feel" and eye-to-brain readings.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A handheld mechanical gauge for measuring tread depth of a vehicle tire, said mechanical gauge comprising:
    a housing defining a display window;
    a fixed stock panel attached to said housing and comprising a first measurement scale located within said window, and said first measurement scale comprising a first series of marks spaced apart at regular intervals within a region of interest defined by said display window, and wherein the total number of marks in said first measurement scale comprises a calibration value;
    a slide panel movably arranged relative to said stock panel, and comprising a second measurement scale adapted to selectively overlie the first measurement scale within the window of said housing, and said second measurement scale comprising a second series of marks spaced apart at regular intervals corresponding to the first series of marks of said first measurement scale, such that at any overlying position of said second measurement scale relative to said first measurement scale within said region of interest, the combined number of exposed marks displayed through said window equals said calibration value; and
    an elongated measurement probe affixed to said slide, and adapted for selectively extending and retracting relative to said housing, whereby thread depth of the vehicle tire is measured by extending said probe into a groove formed in the tire tread and then recording a measurement value using data displayed through said window.

2. The handheld mechanical gauge according to claim 1, wherein said first measurement scale comprises first and second adjacent columns of spaced marks.

3. The handheld mechanical gauge according to claim 2, wherein in said first measurement scale, the marks in said second column are staggered relative to the marks of said first column.

4. The handheld mechanical gauge according to claim 3, wherein said second measurement scale comprises first and second adjacent columns of spaced marks.

5. The handheld mechanical gauge according to claim 4, wherein in said second measurement scale, the marks in said second column are staggered relative to the marks of said first column.

6. The handheld mechanical gauge according to claim 5, wherein said first and second columns of marks in said first and second measurement scales are aligned in substantial registration.

7. The handheld mechanical gauge according to claim 1, and comprising a manual thumb slide adapted for moving said slide panel to extend and retract said measurement probe.

8. The handheld mechanical gauge according to claim 1, wherein said housing comprises cooperating front and back sections.

9. The handheld mechanical gauge according to claim 1, and comprising a magnet located inside said housing for releasably mounting said gauge to a metal surface.

10. The handheld mechanical gauge according to claim 1, and comprising a machine-readable code applied to said housing.

11. The handheld mechanical gauge according to claim 1, and comprising a product serial number applied to said housing.

12. The handheld mechanical gauge according to claim 1, and comprising measurement indicia applied to said housing along at least one side of said display window.

13. The handheld mechanical gauge according to claim 1, and comprising measurement indicia applied to said housing along both sides of said display window.

14. The handheld mechanical gauge according to claim 13, wherein said measurement indicia is provided in standard units along one side of said display window and in corresponding metric units along the other side of said display window.

15. A handheld mechanical gauge for measuring tread depth of a vehicle tire, said mechanical gauge comprising:
    a stock panel comprising a first measurement scale, said first measurement scale comprising a first series of marks spaced apart at regular intervals within a region of interest, and wherein the total number of marks within said region of interest comprises a calibration value; and
    a slide movably arranged relative to said stock panel, and comprising a second measurement scale adapted to selectively overlie the first measurement scale within said region of interest, and said second measurement scale comprising a second series of marks spaced apart at regular intervals corresponding to the first series of marks of said first measurement scale, such that at any overlying position of said second measurement scale relative to said first measurement scale within said region of interest, the combined number of exposed marks within said region of interest equals said calibration value; and
    an elongated measurement probe affixed to said slide and adapted for selectively extending into a groove formed in the tread of the vehicle tire, whereby a measured value of tread depth is obtained using data displayed within said region of interest.

16. A method for measuring tread depth of a vehicle tire, comprising:
    locating a handheld mechanical gauge adjacent the tread of the vehicle tire, the mechanical gauge comprising:
        (i) a first measurement scale comprising a first series of marks spaced apart at regular intervals within a predetermined region of interest;
        (ii) a slidable second measurement scale adapted to selectively overlie the first measurement scale within the region of interest, and the second measurement scale comprising a second series of marks spaced apart at regular intervals corresponding to the first series of marks of the first measurement scale; and
        (iii) an elongated measurement probe movable in unison with the slidable second measurement scale;
    determining a calibration value comprising a total number of exposed marks within the region of interest of the mechanical gauge;
    inserting and extending the elongated measurement probe of the mechanical gauge into a groove formed in the tread of the vehicle tire;
    with the probe extended, photographing the region of interest of the mechanical gauge using a digital camera of a mobile computing device;
    determining the number of exposed marks of the first measurement scale which are located within the region of interest;
    determining the number of exposed marks of the second measurement scale which are located within the region of interest;
    confirming that the sum total of exposed marks of the first and second measurement scales equals the calibration value; and calculating tread depth using a ratio of exposed marks of the first and second measurement scales within the region of interest.

17. The method according to claim 16, wherein determining the calibration value comprises photographing the mechanical gauge at the region of interest using the digital camera of the mobile computing device, and then calculating the total number of marks appearing within the captured image.

18. The method according to claim 17, and comprising electronically reading a machine-readable code applied to the mechanical gauge.

19. The method according to claim 17, and comprising activating an alert on the mobile computing device to indicate a successfully captured image of the region of interest.

20. The method according to claim 17, and comprising electronically sensing environmental lighting conditions surrounding the vehicle tire, and automatically activating a flash function of the digital camera based on said conditions prior to photographing the mechanical gauge.

* * * * *